US009986142B2

(12) United States Patent
Sandoval et al.

(10) Patent No.: US 9,986,142 B2
(45) Date of Patent: May 29, 2018

(54) POINT OF VIEW / SIGHT PICTURE FIREARM CAMERA (P.O.V.)

(71) Applicants: Maria Ann Sandoval, Rocklin, CA (US); Christopher Alden Champlin, Roseville, CA (US)

(72) Inventors: Maria Ann Sandoval, Rocklin, CA (US); Christopher Alden Champlin, Roseville, CA (US)

(*) Notice: Subject to any disclaimer, the term of this patent is extended or adjusted under 35 U.S.C. 154(b) by 50 days.

(21) Appl. No.: 14/742,617

(22) Filed: Jun. 17, 2015

(65) Prior Publication Data
US 2016/0373700 A1 Dec. 22, 2016

(51) Int. Cl.
| H04N 5/225 | (2006.01) |
| G03B 29/00 | (2006.01) |
| F41C 27/00 | (2006.01) |
| H04N 5/77 | (2006.01) |

(52) U.S. Cl.
CPC .......... *H04N 5/2257* (2013.01); *F41C 27/00* (2013.01); *G03B 29/00* (2013.01); *H04N 5/77* (2013.01); *H04N 5/772* (2013.01)

(58) Field of Classification Search
CPC ...... H04N 5/2257; H04N 5/772; F41V 27/00; G03B 29/00; G03B 17/561; F41C 27/00
See application file for complete search history.

(56) References Cited

U.S. PATENT DOCUMENTS

| 6,434,875 | B1* | 8/2002 | Constant ................ F41A 15/16 42/70.11 |
| 6,539,661 | B2* | 4/2003 | Hope ...................... F41C 27/00 42/119 |
| 7,937,880 | B1* | 5/2011 | Fidlow .................... F41A 17/06 396/426 |
| 9,140,509 | B2* | 9/2015 | Sullivan .................. F41A 35/00 |
| 9,335,109 | B2* | 5/2016 | Bensayan ............. F41A 17/063 |
| 9,347,723 | B2* | 5/2016 | Burdine ................ F41A 17/063 |
| 9,354,009 | B1* | 5/2016 | Fidlow .................. F41A 17/063 |
| 9,488,437 | B1* | 11/2016 | Schnog ...................... F41J 5/10 |
| 9,846,007 | B2* | 12/2017 | Young .................... F41C 27/00 |
| 9,897,407 | B2* | 2/2018 | Kramer ................ F41A 17/063 |
| 2002/0002788 | A1* | 1/2002 | Hope ...................... F41C 27/00 42/106 |
| 2006/0082730 | A1* | 4/2006 | Franks .................... F41A 17/06 352/95 |
| 2006/0086032 | A1* | 4/2006 | Valencic ............. F41H 13/0018 42/70.01 |
| 2007/0257987 | A1* | 11/2007 | Wang ..................... H04N 7/188 348/158 |
| 2008/0066362 | A1* | 3/2008 | Fidlow .................... F41A 17/06 42/90 |
| 2008/0112698 | A1* | 5/2008 | Ray ........................ G03B 29/00 396/56 |
| 2011/0035984 | A1* | 2/2011 | Liu ........................ F41C 27/00 42/111 |

(Continued)

*Primary Examiner* — John Villecco

(57) ABSTRACT

A integrated rechargeable evidence collecting and recording device built into a firearm that automatically collects and records evidence of the users point of view when a firearm is in use, and pointing at the intended target. The integrated rechargeable evidence collecting and recording device consists of a rechargeable battery, microphone, camera, and digitally encrypted memory for the preservation of said evidence in accordance with agency guidelines.

3 Claims, 3 Drawing Sheets

(56) References Cited

U.S. PATENT DOCUMENTS

| | | | | |
|---|---|---|---|---|
| 2014/0378088 A1* | 12/2014 | Goel | ............... | F41A 17/063 455/404.2 |
| 2015/0198406 A1* | 7/2015 | Ling | ............... | F41G 11/003 42/90 |
| 2015/0229813 A1* | 8/2015 | Isaac-Lowry | ............... | H04N 5/2254 348/376 |
| 2015/0253106 A1* | 9/2015 | Lupher | ............... | F41A 17/08 42/111 |
| 2015/0369554 A1* | 12/2015 | Kramer | ............... | F41A 17/063 386/227 |
| 2016/0021329 A1* | 1/2016 | Sakiewicz | ............... | H04N 5/772 386/227 |
| 2016/0165192 A1* | 6/2016 | Saatchi | ............... | H04N 5/772 386/227 |
| 2016/0290766 A1* | 10/2016 | Williams | ............... | F41C 27/00 |
| 2016/0316128 A1* | 10/2016 | Teich | ............... | F41G 3/165 |
| 2017/0034405 A1* | 2/2017 | Ryniec | ............... | H04N 5/2251 |
| 2017/0248388 A1* | 8/2017 | Young | ............... | F41C 27/00 |
| 2017/0284754 A1* | 10/2017 | Chakraborty | ............... | F41A 17/063 |
| 2017/0302881 A1* | 10/2017 | Sakiewicz | ............... | H04N 5/772 |
| 2017/0321990 A1* | 11/2017 | Taylor | ............... | F41C 27/00 |
| 2017/0370679 A1* | 12/2017 | Willmann | ............... | F41G 11/003 |
| 2018/0010882 A1* | 1/2018 | Soltys | ............... | F41C 27/00 |
| 2018/0023910 A1* | 1/2018 | Kramer | ............... | F41J 5/10 |

* cited by examiner

POINT OF VIEW / SIGHT PICTURE FIREARM CAMERA (P.O.V.)

BACKGROUND

The present invention relates to a recording device for collecting and preserving audio and video evidence related the use of a firearm, capturing the firearm and user's sight picture and point of view (P.O.V.).

When law enforcement personnel discharges a firearm, an investigation(s) will automatically ensue. This investigation makes a determination if such actions were necessary and in accordance with the law and agency guidelines. The public and media raise questions of social responsibility and liability particularly when such actions result in injury or death This invention will help preserve both the audio and visual of events leading up to an altercation and help solidify the moment as seen by the said interaction, and help solidify the movement as seen by the users (P.O.V.) for later discussion, training, and dissemination when needed.

SUMMARY

The premise of this invention, is to provide a device that will automatically collect and record evidence or the (P.O.V.) of a gun used by a law enforcement official or other person who is licensed or otherwise authorized to use the weapon.

The (P.O.V.) object is created in accordance with the present invention, by providing a self-contained rechargeable battery, electronic evidence-collecting device incorporated into to the firearms frame, lower receiver, and back-strap on the grip. This evidence collecting and recording device is activated by the removal of the gun from its holster and raised to a 90 degree angle. As long as the firearm is in movement, the device will remain active. Once the firearm is lowered or is sitting still in excess of a determined amount of time, a sensor will disengage the device and place it into a standby mode.

DESCRIPTION

Figure 1:
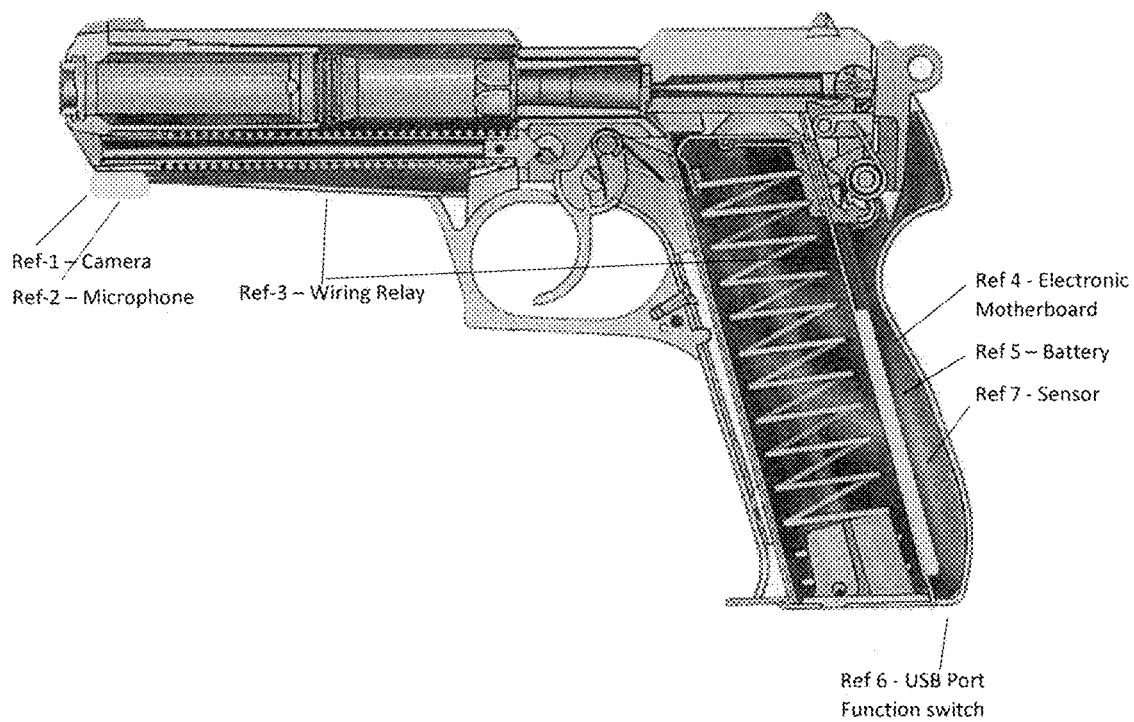
FIG. 1 represents a cut out simulation of the side view of the POV camera gun.
Ref-1: Camera housing location built into the frame
Ref-2: Microphone housing location built into the frame
Ref-3: Wiring relay channeled through the polymer frame of the fireman
Ref-4: Location of electronics motherboard
Ref-5: Battery imbedded into firearm grip
Ref-6: Location of access points to include USP port and power switch
Ref-7: Sensor
Figure 2:
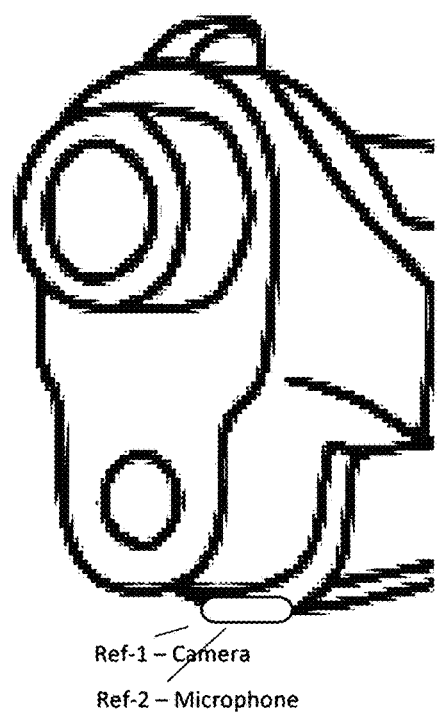
FIG. 2 represents the front view of the firearm, and location of the camera and microphone.
Ref-1: Camera
Ref-2: Microphone
Figure 3:
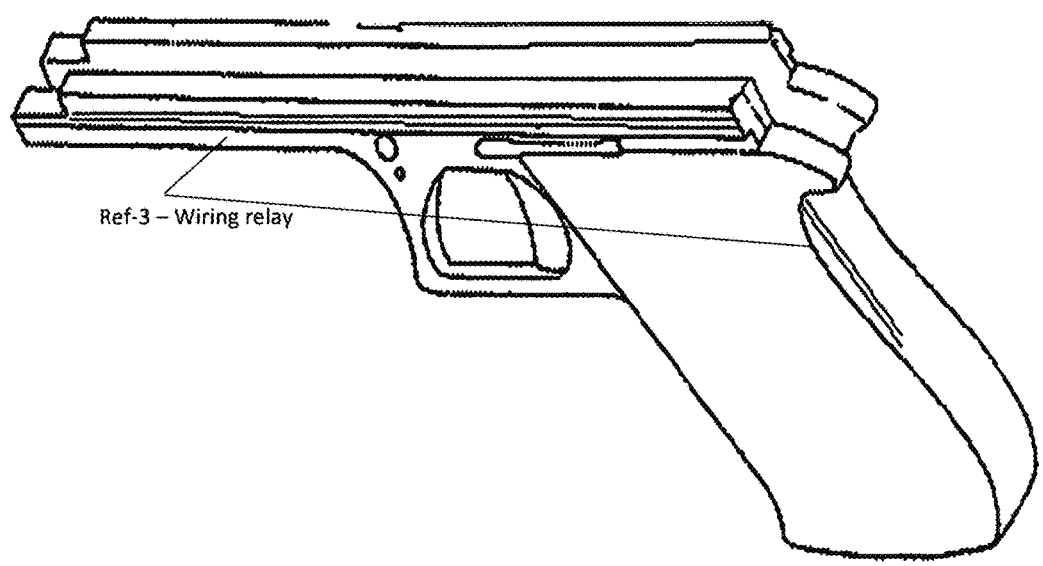
FIG. 3 represents a cross cut of the lower frame of the firearm, and the direction of travel for the wiring relay.
Ref-3: Wiring Relay

As represented in Claim 1, the POV/Sight Picture camera is a permanent fixture, built into the semi-automatic firearm by the manufacturer. Heat resistant/shield wires will be encased into the frame by way of a routed channel set below the slide assembly/barrel into the back-strap of the firearms grip.

Built into the grip is the camera's motherboard, with all sensors, batteries, storage, and access ports. All access ports are recessed into the grip, with dust cover protection, and housed in a water resistant gel coating. The dust port will be the USP access location to charge/download film.

Specially designed software will allow the end user access to the program that is running the camera, with the ability to set date/time, set passwords, access film, and a log.

CROSS-REFERENCE

At this time, we are unaware of any patent design that has a fully integrated camera, built into the frame of the firearm. There are external devices, and add on accessories, but again, nothing fully integrated and part of the firearm itself. Patent application No. 61761270 "Evidence Collecting and Recording Apparatus for a Gun" is externally mounted to a handgun and requires a smart telephone for recording capabilities.

CONCLUSION

Questions of responsibility and liability are raised by all parties concerned as well as the media, especially when there is injury or death resulting from the use of force utilizing a firearm. This invention will help preserve both the audio and visual of an altercation, and help solidify the moment as seen by the user's point of view for later discussion, training, and dissemination when needed.

The invention claimed is:
1. A handgun for collecting and preserving evidence of an event relating to the use of the handgun, said handgun comprising:
   a camera system mounted inside of the handgun and integrated into a polymer frame of the handgun, said camera system comprising:
   a video camera for producing HDMI video signal data representing video information obtained from the point of view of the handgun;
   a microphone that can capture HDMI quality audio data obtained related to the deployment of the handgun;
   wherein the HDMI video signal data and HDMI quality audio data is stored on the handgun in an internal memory;
   wherein the camera system is built into the handguns frame, stock, and grip;
   wherein the cameras system's electrical components are installed into a back-strap of a grip of the handgun behind a magazine well; and
   wherein heat resistant and/or shielded wires run from the video camera and the microphone to the electrical components in the back-strap and are routed by way of a channel set below the slide assembly and barrel and inside a body of the handgun.
2. The handgun of claim 1, further comprising a sensor that will activate the camera system when it reaches a 90 degree angle, wherein after a predetermined time of no movement, the camera system will switch to a standby mode until raised and moved again.
3. The handgun of claim 1, wherein the internal memory maintains the HDMI video signal data and HDMI quality audio data as digitally encrypted data to be downloaded by an end user via a USB portal device.

\* \* \* \* \*